ACEY L. FLOYD
INVENTOR.

BY Fritz B. Peterson
AGENT 2,879,360

PHOTOCONDUCTIVE DEVICE HAVING A SILICON DIOXIDE PROTECTIVE LAYER AND METHOD OF MAKING SAME

Acey L. Floyd, Jr., Duarte, Calif., assignor to Lane-Wells Company, Los Angeles, Calif., a corporation of California Application October 1, 1956, Serial No. 613,173
11 Claims. (Cl. 201—63)

This invention relates to photoconductive devices; and more particularly to improvements in such cells and improved procedures for producing and protecting them.

It is known to prepare thin-film type photoconductive cells by vacuum sublimation of CdS and receiving a deposit of the sublimation product upon a suitable base, the deposit being formed between or having thereafter applied, suitable electrodes. Several objectionable features characterize cells thus produced. In general, they lack uniformity of electro-optical characteristics such as sensitivity, are non-ohmic except in rare and unpredictable instances, and some cells fail to attain any appreciable degree of photoconductivity. In a concurrently-filed application of applicant, Serial No. 612,929, there is disclosed a procedure wherein a vacuum deposited photoconductive film is subjected to heat treatment in excess of that required to produce maximum sensitivity, whereby the film is rendered substantially insensitive. The surface portion of the film is removed, leaving a film having a high degree of sensitivity. Apparently during those stages of the heat treatment during which maximum sensitivity is approached and immediately thereafter, a "poisoning" surface layer is produced on the CdS film, which causes the sensitivity to decrease to substantially zero value. Removal of the surface layer of the film leaves only the highly sensitive remainder of the film in place on the base.

The present invention has for a principal object, provision of a procedure for producing a photoconductive microcrystalline film of very high sensitivity without danger of producing the aforementioned "poisoning" surface anomaly on the film; that is, for producing, with certainty and with only a small number of steps, highly sensitive photoconductive films. Another object of the invention is to provide an improved type of photoconductive cell of the thin-film variety. An additional object is to provide a photoconductive film or layer, having a protective covering. An additional object of the invention is to provide a procedure for protecting photoconductive cells of the nature mentioned. Another object of the invention is to provide a procedure for producing photoconductive cells of uniformly excellent characteristics. The mentioned objects and other objects and advantages are attained by the invention, as will be made apparent or as will be evident following consideration of the description of an exemplary procedure according to the principles of the invention. The novel procedures are hereinafter described in connection with the accompanying drawings illustrating in somewhat diagrammatic form an exemplary cell of the category mentioned, and in which drawings:

Figure 1:
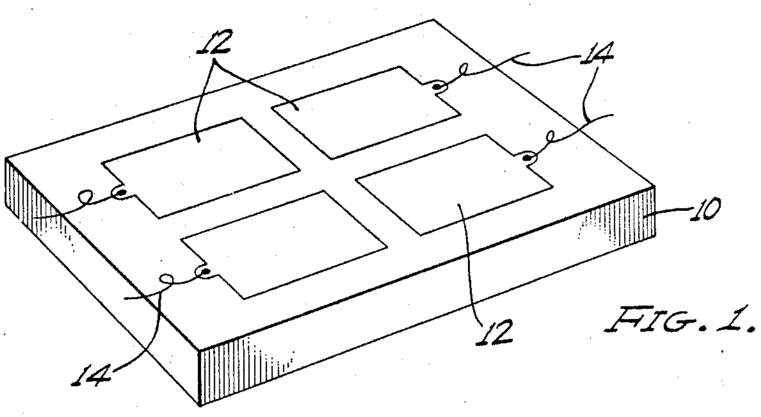
Figure 1 is a view of an exemplary cell base, with electrodes and electrical leads in place.

In the drawings, 10 designates a cell base, which in the selected form of the cell chosen for purposes of illustration, is a rectangular block of electrically insulative material such as glass. It is to be noted that the cell base may be of other configuration, and of other suitable material. Suitably applied to base 10 by any appropriate procedure, as for example, that described in applicant's copending application Serial No. 489,397, filed February 21, 1955, is an array or arrangement of electrically conductive thin-film electrodes 12, 12, of chromium, gold, indium or other suitable metallic material. Preferably, and in accord with considerations disclosed in concurrently filed applications of Czipott and Floyd, Serial Nos. 613,171 and 613,172, the electrodes 12 are formed of indium. Suitable electrical leads 14 may be soldered or otherwise affixed in conducting relationship with respective electrodes 12.

Figure 2:
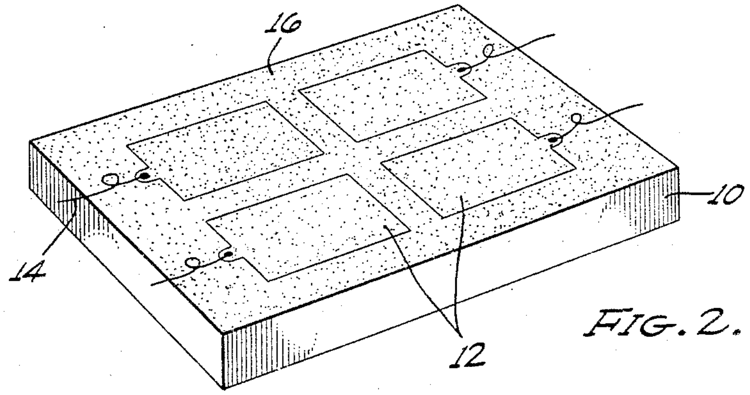
Figure 2 is a view of the unit shown in Figure 1, with a surficial layer of photoconductive cadmium sulphide or the like applied.

In accord with the novel procedures provided by the invention, a surficial film or layer of a photoconductor material 16 is applied or formed over and between electrodes 12. This layer is designated by stippling in Figures 2 and 3, and is of material that is photoconductive or potentially photoconductive; such as cadmium sulphide. The layer may be applied by sublimation of the material 16 in vacuo and concurrently there receiving a deposit of the sublimation product on the base and electrodes. This mode of applying a thin layer or film of material onto a surface is well known as "vacuum evaporation," and may be such as is described in the aforementioned patent application of Floyd, Serial No. 489,397. Material 16 may be to some extent photosensitive as deposited in the vacuum chamber, but whether sensitive or not, is preferably heat treated or "baked" sufficiently to transform the groups of particles of material into a form in which a much higher degree of photosensitivity is exhibited. For example, the cell unit including material 16 may be subjected to a temperature of 400° C.–500° C. for a period of sufficient duration to insure complete sensitization of the material. This heat treatment or "baking" of the photoconductor layer may alternatively either precede, or follow, application of protective material over material 16. Preferably the photoconductor (which may include so-called "impurities") is baked or otherwise heated to a state of high photosensitivity subsequent to application of the protective material.

Application of material adapted to form or provide a protective cover or coating over all or a desired area of the photoconductor layer may be effected according to any suitable procedure, but preferably is performed by vacuum sublimation and condensation of suitable cover material in a manner similar to that by which the photoconductor layer is laid down on the cell base. A preferred basic material for the protective layer or film is silicon monoxide, since that material sublimes at a relatively low temperature (somewhat in excess of 200° C.) and may, by suitable heat treatment in the presence of oxygen, be converted into silicon dioxide to form a substantially impervious transparent cover. The surficial layer or deposit of silicon monoxide thus applied to the cell unit by vacuum sublimation or otherwise may be as thick as is desired or required; and since the final protective film will be substantially pure quartz, it will not adversely affect the electro-optical characteristics of the cell.

Figure 3:
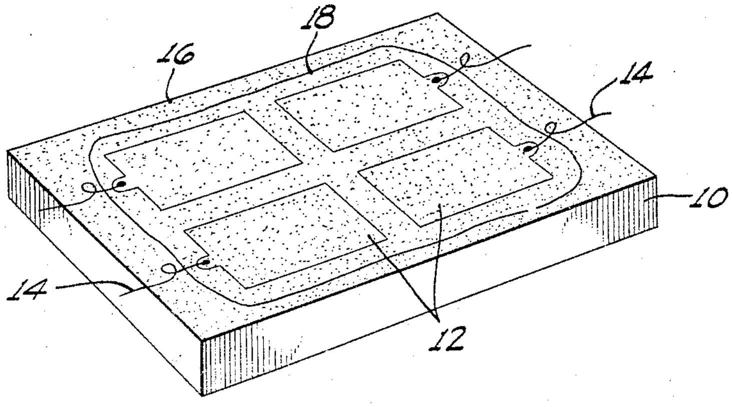
Figure 3 is a view of the cell unit with a protective coating applied over an essential area of the photoconductive material.

As previously indicated, the cell unit with the deposited layer or film of silicon monoxide is preferably next subjected in the presence of oxygen to heat of sufficient degree and intensity to convert the silicon monoxide to silicon dioxide. This heating may, for example, be at a temperature somewhat above 200° C. and is continued until the indicated conversion has been substantially or wholly completed. Thereafter the photoconductor film may be subjected to the sensitizing heat treatment if the latter was not performed prior to deposition of the silicon monoxide layer. In Figure 3 of the drawings a completed cell is depicted, with the protective film of silicon dioxide indicated at 18. For simplicity of illustration the film is depicted as covering principally only an essential portion of material 16, that is, the portion disposed between conductive electrodes 12.

Thus a highly sensitive photoconductive cell is provided, which has all or any essential area or portion of the photoconductive material fully protected by a film of fused silicon dioxide intimately bonded to the photoconductive material. The protective cover is substantially continuous and substantially impervious, so that substances which could otherwise "poison" the cell are excluded, and the cell surface is also mechanically protected. Further, the protective film may be so thin and so optically transparent as to have substantially no adverse effect upon the cell. Additionally, the protection afforded is permanent, whereby excess oxygen or other deteriorating substances are prohibited from gradually entering and degrading the photoconductive material. While by the described exemplary procedure of depositing cover material on the cell base by subliming in vacuo provides a substantially continuous deposit over all of the exposed surface, it is evident that only an essential, or a predetermined areal extent, of the cell surface need be covered. Any area upon which the cover is not required or desired may be masked during deposition of the silicon monoxide. The particular material used to form the photoconductive layer is not of primary importance in the present invention, it being essential only that that material be actually or potentially photosensitive. In the exemplary cell according to the invention it is preferable that cadmium sulphide form a principal fraction of the photosensitive material, and accordingly a material of the composition specifically disclosed in a concurrently filed patent application of Akos Z. Czipott and Acey L. Floyd, Serial No. 613,171, may be employed.

Since in the light of the present disclosure, modifications of the specific exemplary procedures and materials will be suggested to those skilled in the art, it is not desired to be restricted to the particular illustrative examples described, but what is claimed is:

1. A method of providing a protective translucent cover for a thin film of photoconductor material, comprising depositing a thin layer of silicon monoxide over the photoconductive material, and heating the silicon monoxide in the presence of oxygen to convert the silicon monoxide into a substantially continuous thin cover of silicon dioxide.

2. A method of producing a thin translucent protective coating over a surficial layer of photoconductive material, comprising subliming in vacuo a material consisting essentially of silicon monoxide and there receiving a layer of the sublimed silicon monoxide on and over the layer of photoconductive material, and thereafter converting the layer of silicon monoxide to a substantially continuous coating of silicon dioxide by heating the layer of silicon monoxide in the presence of oxygen.

3. A method of producing a photoconductive cell of the cadmium sulphide type, comprising subliming onto a base in vacuo a deposit of material comprising principally cadmium sulphide, subliming onto said base over said deposit in vacuo a layer of silicon monoxide, and heat treating the cover layer of silicon monoxide in the presence of oxygen to thereby form a thin protective cover of silicon dioxide over said deposit of material.

4. A method of producing a photoconductive cell, comprising preparing an electrically insulative base, subliming in vacuo a photoconductor material and concurrently there receiving on the prepared base at least a portion of the sublimation poduct to provide on the base a thin deposit of the sublimed photoconductor material, subliming silicon monoxide in vacuo and concurrently there receiving over and on at least a portion of the base and thin deposit of photoconductor material a thin coating of silicon monoxide, and thereafter converting the thin coating of silicon monoxide to a coating of silicon dioxide by heating the coating in the presence of oxygen.

5. A method of producing a surface-protected layer of photoconductive material, comprising forming a layer of photoconductive material, subliming silicon monoxide in vacuo and concurrently there receiving on a surface of the layer of photoconductive material a surficial deposit of the sublmied silicon monoxide, and thereafter converting the surficial deposit of silicon-monoxide to a substantially continuous film of silicon dioxide by heating the surficial deposit in the presence of oxygen, to provide a protective film of silicon dioxide over the layer of photoconductive material.

6. A method of producing a photoconductive cell, comprising preparing a cell base, subliming in vacuo a potentially photoconductive material and concurrently there receiving upon the cell base a thin layer of the sublimed material, heating the thin layer of sublimed material to increase its photoconductivity, subliming in vacuo a mass of silicon monoxide and concurrently there receiving upon the thin layer of sublimed material a thin deposit of sublimed silicon monoxide, and heating the thin deposit of silicon monoxide in the presence of oxygen to an extent sufficient to convert the silicon monoxide to silicon dioxide and form a thin translucent protective film overlying the photoconductive material.

7. A photoconductive cell comprising a base, a layer of photoconductive material on said base, and a thin film of silicon dioxide superposed upon and protecting said layer of photoconductive material.

8. A photoconductive cell comprising an electrically insulative base, a thin film of photoconductive material consisting principally of cadmium sulphide on said base, and a thin substantially continuous film of silicon dioxide covering at least an essential portion of said film of photoconductive material.

9. A photoconductive cadmium sulphide cell comprising a base, a thin film of photoconductive material consisting principally of cadmium sulphide on said base, a thin film of fused silicon dioxide covering and in intimate contact with at least an essential portion of said film of photoconductive material, and electrode means providing electrical access to selected portions of said film of photoconductive material.

10. A photoconductive cell comprising means providing an electrically insulative base surface, an array of at least two electrically conductive means disposed in spaced-part fixed positions on said base and insulated each from another, a thin film of photoconductive material extending between and photoconductively interconnecting at least two of said array of electrically conductive means, and a layer of silicon dioxide covering and fused to at least an essential portion of said thin film of photoconductive material.

11. A photoconductive cell of the cadmium sulphide type comprising an electrically insulative base, electrical terminals secured on said base, at least two discrete metallic electrically conductive films on said base and each electrically connected to a respective one of said electric terminals, a layer of photoconductive material consisting essentially of cadmium sulphide disposed over an area of said base and photoconductively interconnecting at least two of said electrically conductive films, and a translucent impervious protective layer of fused silicon dioxide disposed over and intimately bonded to at least an essential portion of said layer of photoconductive material.

References Cited in the file of this patent

UNITED STATES PATENTS

| | | |
|---|---|---|
| 2,651,700 | Gans | Sept. 8, 1953 |
| 2,727,118 | Longini | Dec. 13, 1955 |
| 2,742,550 | Jenness | Apr. 17, 1956 |
| 2,765,385 | Thomsen | Oct. 2, 1956 |

UNITED STATES PATENT OFFICE

CERTIFICATE OF CORRECTION

Patent No. 2,879,360 March 24, 1959

Acey L. Floyd, Jr.

It is hereby certified that error appears in the above numbered patent requiring correction and that the said Letters Patent should read as corrected below.

In the grant, lines 2 and 3, for "assignor to Lane-Wells Company, of Los Angeles, California, a corporation of California," read -- assignor, by mesne assignments, to Dresser Industries, Inc., of Dallas, Texas, a corporation of Delaware,--; line 12, for "Lane-Wells Company," read -- Dresser Industries, Inc.,--; in the heading to the printed specification, lines 5, 6 and 7, for "assignor to Lane-Wells Company, Los Angeles, Calif., a corporation of California" read -- assignor, by mesne assignments, to Dresser Industries, Inc., Dallas, Texas, a corporation of Delaware --; column 3, line 70, for "poduct" read -- product --.

Signed and sealed this 28th day of July 1959.

(SEAL)
Attest:

KARL H. AXLINE
Attesting Officer

ROBERT C. WATSON
Commissioner of Patents